United States Patent
Barclay et al.

[15] 3,681,421

[45] Aug. 1, 1972

[54] PRODUCTION OF UNSATURATED ALIPHATIC NITRILES

[72] Inventors: John Lynn Barclay, Tadworth, England; Edward James Gasson, Dollar, Scotland; David James Hadley, Tadworth, England

[73] Assignee: BP Chemicals Limited, London, England

[22] Filed: June 18, 1970

[21] Appl. No.: 47,565

Related U.S. Application Data

[63] Continuation-in-part of Ser. No. 719,258, April 5, 1968, abandoned.

[30] Foreign Application Priority Data

April 18, 1967 Great Britain............17,717/67

[52] U.S. Cl. ............................................. 260/465.3
[51] Int. Cl. ........................................... C07c 121/02

[58] Field of Search..................................260/465.3

[56] References Cited

UNITED STATES PATENTS

| | | | |
|---|---|---|---|
| 3,424,781 | 1/1969 | Capp et al. | 260/465.3 |
| 3,338,952 | 8/1967 | Callahan et al. | 260/465.3 |
| 3,328,315 | 6/1967 | Callahan et al. | 260/465.3 X |
| 3,591,620 | 7/1971 | Yoshino et al. | 260/465.3 |

*Primary Examiner*—Joseph P. Brust
*Attorney*—Ward, McElhannon, Brooks & Fitzpatrick

[57] ABSTRACT

A process for the production of acrylonitrile by vapor phase catalytic ammoxidation of propylene at an elevated temperature over an oxide composition comprising antimony, vanadium and a polyvalent metal selected from tin, iron, cobalt, or titanium, in specified atom ratios.

4 Claims, No Drawings

PRODUCTION OF UNSATURATED ALIPHATIC NITRILES

This application is a continuation-in-part of applicant's parent application Ser. No. 719,258 filed Apr. 5, 1968 and now abandoned.

The present invention relates to the production of unsaturated aliphatic nitriles and in particular to the production of acrylonitrile.

Processes for the production of acrylonitrile by the vapor phase catalytic reaction of propylene, molecular oxygen and ammonia are known. The catalysts for use in such processes in general comprise compositions containing one or more polyvalent metals combined as a suitable compound or oxide of the metal.

It has now been found that whilst hitherto known catalysts for the reaction of propylene, molecular oxygen and ammonia to produce acrylonitrile have appeared satisfactory on a laboratory or pilot plant scale on a commercial scale plant certain disadvantages have been realized. Thus in particular it has been found that the selectivity of the known catalysts varies according to the operating pressure and that under increased pressure in the catalytic reactor the selectivity will fall off.

It is an object of the present invention to provide a catalyst with which the selectivity does not vary to the same extent with varying operating pressures as with catalysts known hitherto.

Accordingly the present invention is a process for the production of acrylonitrile which comprises reacting at an elevated temperature in the vapor phase propylene, molecular oxygen and ammonia over an oxide composition comprising antimony, vanadium and one or more additional polyvalent metals tin, iron, cobalt, or titanium, in proportion 1 gm. atom of antimony, 0.12 to 0.5 gm. atoms of vanadium and 0.25 to 0.5 gm. atoms of each additional polyvalent metal.

The oxide composition catalysts of the present invention may be regarded either as mixtures of antimony oxide and vanadium oxide with an oxide of a polyvalent metal or metals or as oxygen-containing compounds of antimony, vanadium and a polyvalent metal or metals; under the reaction conditions either or both forms may be present.

The catalysts may be prepared, for instance, by intimately mixing the oxides or compounds yielding the oxides on heating, or by co-precipitation of the oxides, hydrated oxides or insoluble salts, from aqueous solution. The polyvalent metal oxide or compound may be added during or after the admixture of the antimony and vanadium oxides or compounds. Compounds of antimony which may be used in the manufacture of the catalysts include antimony trioxide, antimony tetroxide, antimony pentoxide or mixtures of such oxides. Hydrated forms of the oxides may also be used, for instance, compounds such as are formed by the action of the aqueous nitric acid on antimony metal. Particularly suitable compounds of polyvalent metals for the preparation of the catalyst are nitrates or chlorides.

The proportions of the various components of the catalyst may vary within the above defined limits.

It is preferred to give the catalyst a prior heat-treatment, for instance at a temperature between 550° and 1,100° cc. in a molecular oxygen-containing gas.

The reaction of propylene with oxygen and ammonia over the catalysts may be carried out in any suitable manner, for instance as a fixed bed process in which the catalyst is used in the form of granules or pellets, or as a fluidized bed process, or as a moving bed process.

The proportion of propylene in the feed to the reaction may vary within fairly wide limits, for example, between 1 and 20 percent by volume of the feed, and suitably between 2 and 10 percent by volume. It is preferred to use between 5 and 8 percent by volume of propylene in the feed.

The concentration of oxygen in the feed may also vary within moderately wide limits, for example, between 1 and 20 percent by volume. The oxygen may be diluted with inert gases, and may be for example, supplied as air.

The reaction is suitably carried out in the presence, as diluent, of a gas which is substantially inert under the conditions of reaction, for example, nitrogen, propane, butane, isobutane, carbon dioxide and steam. It is preferred to carry out the reaction in the presence of steam or mixtures of steam and nitrogen. The concentration of the steam may vary within wide limits, for instance between 10 and 60 percent by volume of the feed.

The concentration of ammonia may also vary within moderately wide limits, for instance, between 2 and 10 percent by volume of the feed. If the maximum yield of acrylonitrile on propylene is required, it is desirable to use an excess of ammonia over propylene. For instance, the preferred concentration of ammonia is about 5–6 percent by volume of the feed where this contains 5 percent of propylene.

The reaction is carried out at an elevated temperature preferably below 500° C., e.g., between 300° and 450° C.

The contact time, defined as the volume of catalyst divided by the flow of gas per second calculated at room temperature and pressure, may be, for example in the range 1–30 seconds.

The reaction may be carried out at atmospheric pressure, or at super- or sub-atmospheric pressures. It is preferred to operate at a pressure of 1 to 5 atmospheres absolute. Surprisingly, it has been found that the selectivity of the catalysts used in the process of the present invention does not fall off with increasing reaction pressures as with catalysts employed hitherto but in fact may increase with increasing pressure.

The acrylonitrile may be recovered from the reaction products in any suitable manner, for example by extraction with water, preferably at an acid pH, followed by fractional distillation. In one method the hot reaction gases are contacted firstly with a cold dilute aqueous solution of sulphuric acid which neutralises excess ammonia and extracts some of the nitrile, and secondly with cold water to extract the remainder of the nitrile; the nitrile is subsequently recovered from the extractions by fractional distillation.

The process of the present invention is described in more detail with reference to the following examples.

EXAMPLE 1

Antimony trioxide powder (4,664 parts by weight) was added during 10 minutes to a stirred mixture of water (24,000 parts) and concentrated nitric acid (70 percent, 8000 parts) at 95°–100° C. Powdered tin metal (1,898 parts) was added to the stirred suspension over 30 minutes, the temperature being maintained at 95°–100°. Stirring was continued at this temperature for 15 minutes and slurry centrifuged.

The catalyst cake from the centrifuge was resuspended in water (24,000 parts) at 40° C and ammonia solution (one volume 0.880 in two vols water) added until the pH was 7.0. The slurry was stirred for a further 5 minutes, the pH again readjusted to 7.0, and the slurry centrifuged. The cake was resuspended in water (24,000 parts) at 40° and recentrifuged.

Vanadium pentoxide powder (1,456 parts) and graphite (80 parts) were added to the slurry and thoroughly mixed in. The wet paste was dried on trays at 120° overnight and the powder pelleted to 5/32 in. right cylinders and heated in a stream of air at 850° for 16 hours following a controlled rise from 300° to 850° at 20°/hour.

The catalyst was loaded into a 10 ft. × 1 in. reactor, the inlet half of the catalyst charge being diluted with 45 percent v/v inert diluent. A feed gas composition of 5 percent propylene, 6 percent ammonia, 60 percent air and 29 percent steam was fed to the reactor giving a contact time of 4 seconds and an inlet pressure of 20 lbs. At a bath temperature of 438°, 63.9 percent of the propylene fed was converted to acrylonitrile, 2.3 percent to acrolein, 7.3 percent to hydrogen cyanide and 19 percent to carbon oxides.

EXAMPLE 2

Antimony trioxide powder (3,182 parts by weight) was added during 10 minutes to a stirred solution of water (12,000 parts) and concentrated nitric acid (3,600 parts, 70 percent) at 95° –100°. Powdered tin metal (860 parts) was added to the stirred suspension at 95°–100° over 30 minutes, and stirring continued at this temperature for a further 15 minutes and the slurry centrifuged.

The catalyst cake was resuspended in distilled water (16,000 parts) and a solution of ferric nitrate (1,469 parts) in water (2,000 parts) added. The pH of the stirred suspension was raised 7.0 at 40° C by the addition of ammonium hydroxide solution.

The slurry was stirred at 40° for a further 10 minutes and pH again readjusted to 7.0, and then centrifuged. The cake was resuspended in water (12,000 parts) for 30 minutes at 40° and recentrifuged.

Vanadium pentoxide powder (662 parts) and graphite (60 parts) were added to the slurry and thoroughly mixed in. The wet paste was thoroughly dried on trays at 120° overnight, the powder pelleted to 5/32 in. right cylinders, and heated in a stream of air at 850° for 16 hours following a controlled rise from 300° to 850° at 20°/hour.

The catalyst was loaded into a 10 ft. × 1 in. reactor, the inlet half of the catalyst bed being diluted with 45 percent v/v inert diluent. A feed gas composition of 5 percent propylene, 6 percent ammonia, 65 percent air, and 24 percent steam was fed to the reactor giving a contact time of 4 seconds and an inlet pressure of 20 p.s.i.g. At a bath temperature of 447°, 65.4 percent of the propylene fed was converted to acrylonitrile, 1.5 percent to acrolein, 7.6 percent to hydrogen cyanide and 19.8 percent to carbon oxides.

EXAMPLE 3

A pelleted (5/32 in.) oxide catalyst containing antimony, vanadium and titanium in the atomic ratio (2:1:0.79) was prepared in the same way as described in Example 1 except that an equivalent amount of powdered titanium metal was substituted for the powdered tin metal used in Example 1.

The catalyst so prepared was loaded into a 10 ft. × ½ in. I.D. reactor and fed with a gas feed consisting of ammonia, 6 percent v/v; propylene, 5 percent air, 60 percent, and steam, 29 percent at 3.5 seconds contact time (N.T.P.) and an inlet pressure of 12 p.s.i.g. At a temperature of 470° the yields were: acrylonitrile 56.4 percent; acrolein 2.0 percent; hydrogen cyanide, 8.7 percent; carbon monoxide, 7.5 percent, and carbon dioxide, 6.6 percent.

EXAMPLE 4

Cobalt nitrate hexahydrate (145 parts by weight) was dissolved in water (300 parts by weight) and antimony trioxide (219 parts by weight) added. The mixture was vigorously stirred and sufficient ammonium hydroxide (Sp.gr. 0.880) was added until a pH of 8.0 was reached. The solid was then filtered off and dried to a cake.

Meanwhile, vanadium pentoxide (18.2 parts by weight) was stirred with water (100 by weight) at 50° C and dissolved by the addition of sufficient oxalic acid. The mixed antimony cobalt cake was then added to the vanadium oxalate solution and the whole mixture evaporated to dryness. After drying the residue for 12 hr. at 120° C it was formed into one-eighth in. diameter tablets which were heated in an air stream, initially at 100° C. The temperature was then raised to 800° C at the rate of 22°/hr. and maintained at 800° C for 16 hr. The catalyst contained antimony, vanadium and cobalt in the atomic ration of 3:0.4:1 respectively.

The pelleted oxide catalyst was loaded in a reaction which is a glass U-tube of internal diameter 10 mm. immersed in a molten tin bath. A feed gas composition of 5 percent propylene, 6 percent ammonia, 54 percent air and 35 percent steam was preheated and fed to the reactor giving a contact time of 4.5 seconds and an inlet pressure of 10 mmHg above atmospheric. At a bath temperature of 475°C, a yield of 40 percent acrylonitrile based on the propylene fed was obtained at a selectivity of 51 percent based on propylene consumed.

What is claimed is:

1. A process for the production of acrylonitrile which comprises reacting at an elevated temperature in the vapor phase propylene, molecular oxygen and ammonia over an oxide composition consisting essentially of oxygen, antimony, vanadium and tin in proportion 1 gm. atom of antimony, 0.12 to 0.5 gm. atoms of vanadium and 0.25 to 0.5 gm. atoms of tin.

2. A process for the production of acrylonitrile which comprises reacting at an elevated temperature in the vapor phase propylene, molecular oxygen and ammonia over an oxide composition consisting essentially of oxygen, antimony, vanadium, tin and iron in proportion 1 gm atom of antimony, 0.12 to 0.5 gm atoms of vanadium and 0.25 to 0.5 gm atoms each of tin and iron.

3. A process for the production of acrylonitrile which comprises reacting at an elevated temperature in the vapor phase propylene, molecular oxygen and ammonia over an oxide composition consisting essentially of oxygen, antimony, vanadium and cobalt in proportion 1 gm. atom of antimony, 0.12 to 0.5 gm. atoms of vanadium, and 0.25 to 0.5 gm. atoms of cobalt.

4. A process for the production of acrylonitrile which comprises reacting at an elevated temperature in the vapor phase propylene, molecular oxygen and ammonia over an oxide composition consisting essentially of oxygen, antimony, vanadium and titanium in proportion 1 gm. atom of antimony, 0.12 to 0.5 gm. atoms of vanadium, and 0.25 to 0.5 gm. atoms of titanium.

* * * * *